Patented Feb. 12, 1935

1,990,968

UNITED STATES PATENT OFFICE 1,990,968

PRODUCTION OF ETHYLIDENE CHLORIDE

Johan Pieter Wibaut, Amsterdam, and Jan van Dalfsen, Rotterdam, Netherlands, assignors to The Dow Chemical Company, Midland, Mich., a corporation of Michigan No Drawing. Application September 5, 1933, Serial No. 688,192

6 Claims. (Cl. 260—166)

The present invention concerns an improved method of preparing ethylidene chloride through reacting hydrogen chloride with acetylene and/or vinyl chloride.

It is known that vinyl chloride can be produced in high yield by contacting a gaseous mixture of hydrogen chloride and acetylene with mercuric chloride, or certain other catalysts, at elevated temperatures. During such reaction, as previously carried out, ethylidene chloride has sometimes been formed as a by-product, but only in relatively low yield. For instance, in German Patent No. 278,249 it is reported that when a gaseous mixture of hydrogen chloride and acetylene was passed over pumice impregnated with mercuric chloride and heated to between 150° C. and 220° C., vinyl chloride was formed quantitatively. In British Patent No. 339,093 (1930) it is reported that, when a similar gaseous reaction mixture was passed over carbon impregnated with bismuth chloride and heated to about 200° C., there was formed more than 100 grams of vinyl chloride per hour and per liter of space occupied by the catalyst, along with from 8 to 10 grams of ethylidene chloride. When silica gel impregnated with antimony chloride was used under similar conditions in place of the carbon impregnated with bismuth chloride, ethylidene chloride was not formed. Said British patent further discloses that certain other substances, e. g. compounds of barium, silicon, calcium, magnesium, mercury, zinc, vanadium, aluminum, and iron are active catalysts for the reaction of hydrogen chloride with acetylene, but the patent does not disclose the nature or yields of the products formed when such other catalysts are used. While the above foreign patents describe methods which may be excellent for the preparation of vinyl chloride from acetylene, it is obvious, from the low and only occasional yields of ethylidene chloride reported, that said methods are not well suited to the commercial production of ethylidene chloride as a major product.

In United States Patent No. 1,900,276 it is disclosed that, when a gaseous mixture of hydrogen chloride and vinyl chloride is passed through a tube containing aluminum chloride heated to about 125° C., ethylidene chloride is formed in between 20 and 40 per cent yield.

We have now found that zinc chloride is a superior catalyst for the reaction of hydrogen chloride with vinyl chloride to form ethylidene chloride, but that zinc chloride, itself, is a relatively poor catalyst for the reaction of hydrogen chloride with acetylene. Mercuric chloride, on the other hand, is an excellent catalyst for the formation of vinyl chloride from acetylene and hydrogen chloride, but a poor catalyst for the formation of ethylidene chloride from vinyl chloride and hydrogen chloride. We have further found, however, that a mixture of acetylene and hydrogen chloride may be contacted, either simultaneously or consecutively, with mercuric chloride and zinc chloride to form ethylidene chloride in good yield.

The invention, then, consists in an improved method of reacting hydrogen chloride with acetylene and/or vinyl chloride to form ethylidene chloride and in certain catalysts particularly effective in promoting such reaction, said method and catalysts being hereinafter fully described and particularly pointed out in the claims. The following description and examples set forth in detail various ways in which the principle of the invention may be employed, but are not to be construed as limiting the invention.

In preparing ethylidene chloride from acetylene according to our method, a mixture of acetylene with preferably at least twice its molecular equivalent of gaseous hydrogen chloride is passed either simultaneously or consecutively over the catalysts mercuric chloride and zinc chloride supported on porous material, e. g. silica gel, tonsil, asbestos, carbon, etc. During contact with the mercuric chloride, the acetylene is largely reacted to form vinyl chloride, and the latter, during contact with the zinc chloride, is reacted to form ethylidene chloride. The reactions may be carried out at any temperature sufficient to cause reaction but low enough so that the reaction products are not appreciably decomposed. For instance, said reactions have been found to proceed smoothly and without material by-product formation at temperatures between 25° and 200° C. However, the reactions may be carried out most rapidly and smoothly at temperatures between about 75° and 175° C.

The product, ethylidene chloride, may be condensed directly from the reacted mixture in nearly pure form, but, if desired, may be purified further by fractional distillation.

Instead of passing a mixture of acetylene with at least twice its molecular equivalent of hydrogen chloride over the catalysts, as described above, a mixture of acetylene with a lesser quantity of hydrogen chloride may first be contacted with the mercuric chloride to form vinyl chloride, and thereafter additional hydrogen chloride may be added and the mixture be passed over zinc chloride to form ethylidene chloride. Also, hydrogen chloride and either acetylene or vinyl chloride may be mixed in the presence of the necessary catalyst to obtain ethylidene chloride. Again, vinyl chloride from any source may be reacted with hydrogen chloride in the presence of zinc chloride to form ethylidene chloride.

The following table of examples sets forth data collected during a number of experiments wherein gaseous mixtures of acetylene and hydrogen chloride and of vinyl chloride and hydrogen chloride were contacted with mercuric chloride and zinc chloride.

The runs described in the table of examples were each made in accordance with the following procedure:—Acetylene or vinyl chloride, as the case may be, was passed into a mixing chamber at a rate corresponding to 1.5 liters per hour at 18° C. and 760 millimeters pressure, and dry hydrogen chloride gas was simultaneously passed into the mixing chamber at a rate corresponding to 2.2 liters per hour at the same temperature and pressure. The mixed gases flowed thence through a reaction tube filled with granular porous material, i. e. silica gel or activated charcoal, impregnated with approximately 0.1 mole per 100 grams of porous material of finely divided and substantially anhydrous mercuric chloride or zinc chloride, or, in run 7, with 0.1 mole of both of said compounds. During passage of the gases, the tube was maintained at the temperatures stated in the table. In making each run, the gases were first passed through the heated tube for two hours so as to thoroughly saturate the porous material therewith, after which the yield of reaction products formed during a measured time interval, usually five hours, was carefully determined.

The gases, as they issued from the reaction tube, were passed through aqueous calcium chloride, whereby excess hydrogen chloride was scrubbed from the gases and the greater part of the ethylidene chloride was condensed as a separate liquid layer. The residual gases were dried by passing them through a tube filled with soda lime. The dried gases were then cooled to a temperature below −18° C., whereby the vinyl chloride and residual ethylidene chloride were condensed. The condensed materials were combined and fractionally distilled to separate and purify the vinyl chloride and ethylidene chloride, and the quantities of the purified compounds were measured.

The yield stated in the table is the per cent of theoretical, based on the quantity of the organic reactant employed.

Table

| Run No. | Catalyst | Reactant | Temperature ° C. | Per cent yield of vinyl chloride | Per cent yield of ethylidene chloride |
|---|---|---|---|---|---|
| 1 | $HgCl_2$—silica gel | acetylene | 25 | 93 | <3 |
| 2 | $HgCl_2$—silica gel | acetylene | 195 | 98 | 1 |
| 3 | $HgCl_2$—silica gel | acetylene | 100 | 95 | |
| 4 | $HgCl_2$—silica gel | vinyl chloride | 100 | | 11 |
| 5 | $ZnCl_2$—silica gel | acetylene | 195 | 10.2 | 5 |
| 6 | $ZnCl_2$—silica gel | vinyl chloride | 100 | | 66 |
| 7 | $HgCl_2$—$ZnCl_2$—charcoal | acetylene | 155 | 57.3 | 30.7 |

In the above table, runs 1 to 3 demonstrate that mercuric chloride is a highly active catalyst over a wide range of temperatures for the preparation of vinyl chloride from acetylene, but a poor catalyst for the preparation of ethylidene chloride from acetylene. Run 4 shows that mercuric chloride is a relatively poor catalyst for the preparation of ethylidene chloride from vinyl chloride. Runs 5 and 6 demonstrate that zinc chloride is a poor catalyst for the reaction of hydrogen chloride with acetylene, but a highly active catalyst for the reaction of hydrogen chloride with vinyl chloride. Run 7 demonstrates that hydrogen chloride can be reacted directly with acetylene in the presence of porous material impregnated with both mercuric chloride and zinc chloride to form ethylidene chloride in satisfactory yield.

While we prefer to use finely divided and substantially anhydrous mercuric chloride and/or zinc chloride supported on a porous base as a catalyst for the reactions herein described, since a maximum surface of catalyst is then exposed to the reaction, said catalytic compounds can be used without a supporting base in any other way, if desired.

The reactions herein described proceed smoothly and quite rapidly at atmospheric pressure, but, if desired, pressures above atmospheric may be employed. In carrying out the reactions under superatmospheric pressures, care must be observed to avoid explosion. The explosion hazard may be reduced by employing a large excess of hydrogen chloride or by diluting the reaction mixture with relatively inert gases, e. g. nitrogen, carbon dioxide, etc. However, in reacting acetylene with hydrogen chloride, it is inadvisable to employ pressures higher than about 50 pounds per square inch.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. In a method of making ethylidene chloride, the step which consists in reacting vinyl chloride with hydrogen chloride in the presence of zinc chloride.

2. In a method of making ethylidene chloride, the step which consists in reacting vinyl chloride with hydrogen chloride in the presence of zinc chloride supported on porous and substantially inert carrier material.

3. In a method of making ethylidene chloride, the step which consists in reacting vinyl chloride with hydrogen chloride in the presence of finely divided and substantially anhydrous zinc chloride supported on porous and substantially inert carrier material.

4. In a method of making ethylidene chloride, the steps which consist in passing a mixture of acetylene and hydrogen chloride over mercuric chloride and zinc chloride supported on porous and substantially inert carrier material at a reaction temperature, separating ethylidene chloride from the reacted mixture, and recycling the residual mixture over the catalyst as described above.

5. In a method of making ethylidene chloride, the steps which consist in passing a mixture of acetylene with at least twice its molecular equivalent of hydrogen chloride over finely divided and substantially anhydrous mercuric and zinc chlorides supported on porous and substantially inert carrier material at a reaction temperature, condensing ethylidene chloride from the reacted mixture, and recycling the residual mixture over the catalyst.

6. In a method of making ethylidene chloride, the steps which consist in passing a mixture of acetylene with at least twice its molecular equivalent of hydrogen chloride consecutively over finely divided and substantially anhydrous mercuric and zinc chlorides supported on porous and substantially inert carrier material at a reaction temperature, condensing ethylidene chloride from the reacted mixture and recycling the residual mixture over the catalyst.

JOHAN PIETER WIBAUT.
JAN van DALFSEN.